United States Patent
Dunagan et al.

(10) Patent No.: US 10,877,786 B1
(45) Date of Patent: Dec. 29, 2020

(54) MANAGING COMPUTE RESOURCE USAGE BASED ON PRIOR USAGE

(71) Applicant: Amazon Technologies, Inc., Seattle, WA (US)

(72) Inventors: John David Dunagan, Redmond, WA (US); Mohit Gupta, Seattle, WA (US); Mihir Sadruddin Surani, Seattle, WA (US); Yuxuan Liu, Kirkland, WA (US); Les Johann Lamprecht, Sammamish, WA (US); John Merrill Phillips, Seattle, WA (US); Malcolm Featonby, Sammamish, WA (US); Roberto Pentz De Faria, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 16/147,412

(22) Filed: Sep. 28, 2018

(51) Int. Cl.
    *G06F 9/455* (2018.01)
    *G06F 9/50* (2006.01)
    (Continued)

(52) U.S. Cl.
    CPC ............. *G06F 9/455* (2013.01); *G06F 9/505* (2013.01); *H04L 43/065* (2013.01);
    (Continued)

(58) Field of Classification Search
    CPC ...... G06F 9/455; G06F 9/505; G06F 9/45545; H04L 43/065; H04L 43/067; H04L 43/0817; H04L 47/823; H04W 28/095
    See application file for complete search history.

(56) References Cited

U.S. PATENT DOCUMENTS 8,825,550 B2   9/2014   Marr et al.
9,292,060 B1   3/2016   Marr et al.
(Continued)

FOREIGN PATENT DOCUMENTS

WO   WO 2018/018575 A1 *  2/2018 ............. G06F 11/30
WO   W O 2018/13298 A *  7/2018 ............. H04W 28/02

OTHER PUBLICATIONS

Co-pending U.S. Appl. No. 13/566,802, filed Aug. 3, 2012.
(Continued)

*Primary Examiner* — Arvin Eskandarnia
*Assistant Examiner* — Chhian (Amy) Ling
(74) *Attorney, Agent, or Firm* — Nicholson De Vos Webster & Elliott, LLP

(57) ABSTRACT

Techniques for managing compute resource usage by virtualized compute instances within a provider network are described. A computer system connected to a provider network hosts one or more compute instances. An agent associated with the computer system obtains per-compute instance resource usage information of computer system resources such as processors, memory, and network interfaces. The agent sends the usage information to a usage management service of the provider network. The usage management service generates usage limits based on the usage information from the agent and on usage targets and sends the usage limits to the computer system. The computer system limits the resource usage of the compute instance based on the usage limits.

23 Claims, 8 Drawing Sheets

(51) Int. Cl.
*H04L 12/26* (2006.01)
*H04L 12/911* (2013.01)
*H04W 28/08* (2009.01)

(52) U.S. Cl.
CPC ........ *H04L 43/067* (2013.01); *H04L 43/0817* (2013.01); *H04L 47/823* (2013.01); *H04W 28/095* (2020.05); *G06F 9/45545* (2013.01)

(56) References Cited

U.S. PATENT DOCUMENTS

| | | | |
|---|---|---|---|
| 10,536,322 B2 * | 1/2020 | Livschitz | H04L 67/1008 |
| 2012/0317358 A1 | 12/2012 | Ando et al. | |
| 2014/0058871 A1 * | 2/2014 | Marr | G06F 9/5005 |
| | | | 705/26.1 |
| 2015/0207750 A1 * | 7/2015 | Birkestrand | H04L 67/10 |
| | | | 709/226 |
| 2015/0347183 A1 | 12/2015 | Borthakur | |
| 2016/0261521 A1 | 9/2016 | Certain et al. | |
| 2017/0093962 A1 * | 3/2017 | Player | G06F 9/5083 |
| 2017/0116051 A1 | 4/2017 | Wagner | |
| 2018/0287898 A1 * | 10/2018 | Bellini | H04L 41/5096 |
| 2019/0220319 A1 * | 7/2019 | Parees | G06F 9/505 |
| 2019/0317788 A1 | 10/2019 | Lang et al. | |

OTHER PUBLICATIONS

Non-Final Office Action for U.S. Appl. No. 16/147,405, dated May 28, 2020, 13 pages.
Notice of Allowance for related U.S. Appl. No. 16/147,405, dated Sep. 10, 2020, 10 pages.

* cited by examiner

US 10,877,786 B1

MANAGING COMPUTE RESOURCE USAGE BASED ON PRIOR USAGE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the following figures.

DETAILED DESCRIPTION

Figure 1:
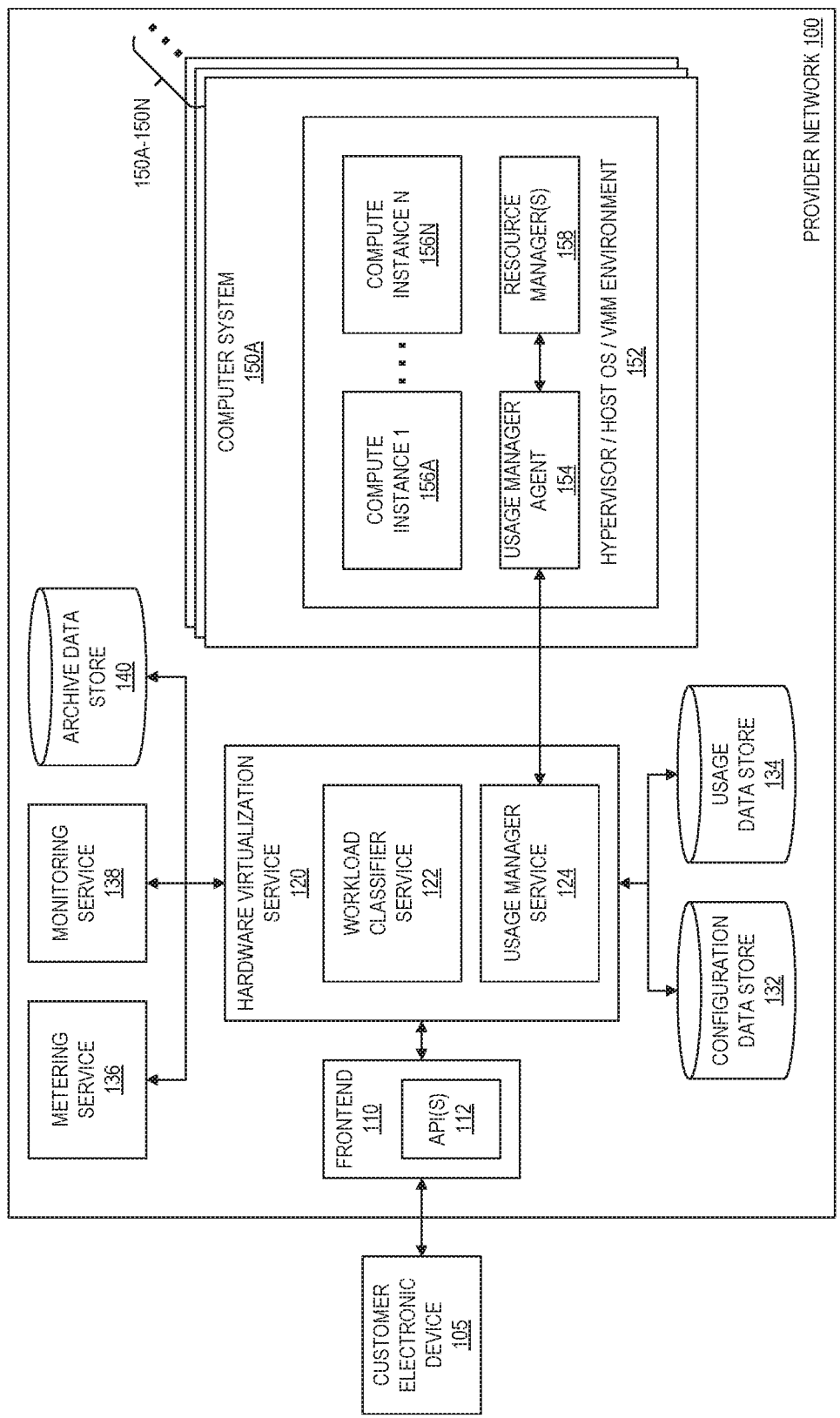
FIG. 1 is a diagram illustrating an environment for managing usage of computer system resources in a provider network according to some embodiments.

Virtualization service providers often offer a range of virtual machine or compute instances that have varying levels of performance and cost. The provider's customers can select a particular compute instance type to launch within the provider's network and configure the launched compute instance to execute the customer's software. Frequently, however, customers are unable to deterministically know their software performance requirements prior to selecting a compute instance type. As a result, some customers might overestimate their requirements and end up paying more for higher performance compute instances that idle for periods of time, while other customers might underestimate their requirements and end up with software performance bottlenecked by the performance of the selected compute instance. Additionally, some customer software may exhibit different performance requirements at different times. Some customers might execute compute intensive simulations periodically throughout the working day, while other customers might have a workload that requires a large amount of network bandwidth at certain times of the day, week, month, etc. to backup customer data to a remote storage device. These customers are forced to select higher cost, higher performance compute instances for worst-case workloads, or lower cost, lower performance compute instances that introduce performance bottlenecks during increased workloads.

To address these and other challenges, various embodiments provide approaches for monitoring the actual usage of compute resources by customer software and adjusting the availability of those compute resources to the customer software. In addition to executing the compute instance executing the customer software, the underlying computer system hosting the compute instance executes an agent software program that monitors the hosted compute instances' actual usage of the computer system's resources (e.g., CPUs, memory, storage devices, and network interfaces). The agent sends usage information to a usage management service of the provider network.

In some embodiments, the usage management service evaluates the usage information from the agents against customer-specified targets. These customer-specified targets govern the performance of the compute instance over the "long-term," providing performance or cost targets over a long period of time relative to the frequency at which agents send usage information to the usage management service. Based on the customer-specified targets and the usage information, the usage management service imposes limits on compute instances' access to the underlying hardware resources. The usage management service adjusts those limits as updated usage information is obtained from the agents. As a result, the performance limits of the compute instance may fluctuate relative to the target, sometimes allowing for higher or lower performance relative to the target.

In some embodiments, the usage management service evaluates the usage information from the agents against workload-specific targets. A workload classifier service of the provider network evaluates the usage information from the agents to categorize or classify a customer's compute instance based on workload. The workload categories may be based on a division of one or more dimensions corresponding to the various resources associated with the usage measurements. For example, workloads may be classified based on CPU usage and memory footprint (i.e., two dimensions) where CPU usage is divided into three ranges (e.g., low, medium, and high levels of usage) and memory footprint is divided into two ranges (e.g., a low level of usage and a high level of usage) and resulting in six categories. The workload classifier service evaluates customer compute instances' usage information from the agents against the ranges that define usage levels and categorizes the compute instance accordingly (e.g., a low memory, high CPU workload; a high memory, medium CPU workload; etc.). Based on the category of a particular compute instance, the workload classifier service sets targets that govern the performance of the compute instance over the long-term, such as the user-specified targets as described above.

Regardless of whether the customer or a classifier sets or determines the targets, the usage management service adjusts the available performance of a compute instance based on the target. In this manner, the customer can avoid selecting a particular compute instance type having a fixed level of performance and the associated increased cost or decreased performance.

FIG. 1 is a diagram illustrating an environment for managing usage of computer system resources in a provider network according to some embodiments. As shown, a provider network 100 includes a frontend 110, a hardware virtualization service 120, and computer systems 150A-150N.

A provider network 100 provides customers with the ability to utilize one or more of a variety of types of computing-related resources such as executing compute instances (e.g., a virtual machine (VM)) and/or containers, executing batch jobs, executing code without provisioning servers, etc. To provide these and other computing resource services, provider networks 100 often rely upon virtualization techniques. In one embodiment, computing resources, which may be rented or leased to customers, are provided via the hardware virtualization service 120. The hardware virtualization service 120 allows multiple compute instances (e.g., VMs) of one or more customers to share the same underlying computer system such as computer systems 150A-150N.

Customers interact with the hardware virtualization service 120 via an interface such as a frontend 110. For example, a customer electronic device 105 sends messages to and receives messages from the frontend 110 across one or more intermediate networks (e.g., the interna). Frontend 110 includes one or more application programming interfaces 112 (APIs) that enable devices, such as the customer electronic device 105, to communicate with backend services of the provider network 100, such as the hardware virtualization service 120. These API-based interactions may occur via a web-browser based interface, a command-line interface (CLI), software development kit (SDK) integrations, etc. In addition to facilitating communications with backend services, the frontend 110 may perform access control checks to verify the identity of customers and their associated permissions to backend services.

Customers launch and configure compute instances according to their needs by interacting with the hardware virtualization service 120. Upon receiving a request to launch a compute instance, the hardware virtualization service 120 identifies a computer system 150 to host the compute instance 156. As indicated above, a single computer system 150 can host multiple compute instances 156. Computer systems 150 include underlying physical components to support compute instances 156. Such components may include general purpose processors (e.g., a central processing unit (CPU)), memory (e.g., random-access memory (RAM)), special purpose processors (e.g., accelerators), block I/O storage (e.g., disk or solid-state storage drives), network interfaces, and the like. Each of these components may offer a certain level of performance, which is shared amongst one or more compute instances 156. To facilitate such sharing, the compute instances 156 operate in an environment 152 such as a hypervisor executing on a computer system 150, a hypervisor executing within a host operating system (OS) executing on a computer system 150, a virtual machine manager (VMM), or the like, that controls access to the underlying physical components of the computer systems 150 by the compute instances 156. The compute instances 156 execute customer software, which may include an operating system and one or more applications, some of which may be licensed by third-parties. From the perspective of the environment 152 within which the compute instances 156 operate, an operating system executed by a compute instance 156 may be considered a guest OS.

The environment 152 includes a usage manager agent 154. The usage manager agent 154 monitors the usage of the underlying physical components of the computer system by the compute instances 156. In one embodiment, the usage manager agent 154 obtains per-compute instance CPU, memory, network, etc. resource usage information from kernel- or hypervisor-managed data within the environment 152. For example, a host OS may include system libraries that allow the usage manager agent 154 to obtain per-process CPU, memory, network, etc. resource usage. A single process may represent each compute instance 156, or the usage manager agent 154 may associate multiple processes with a particular compute instance 156 (e.g., and total the resource usage of the processes). Usage information may be absolute (e.g., gigabytes of memory) or relative (e.g., percentage of CPU usage). Once the usage manager agent 154 has obtained per-compute instance usage values of one or more of the underlying physical components of a computer system 150, the usage manager agent 154 sends or vends the usage information to a usage manager service 124 (e.g., by making an API call to the usage manager service 124 or by making an API available that the usage manager service 124 can query to obtain the usage information). In one embodiment, the usage manager service 124 provides a reportAndGet API function through which the usage manager agent 154 reports the usage information to the usage manager service 124 and gets updated limits for the compute instances 156, as described below. In some embodiments, usage information is transferred from the usage manager agent 154 to the usage manager service 124 at some predetermined interval (e.g., approximately every minute, every five minutes, etc.). Depending on the length of the interval, the usage manager agent may collect multiple samples of usage information of the resources and send an average of the samples to the usage manager service 124. For example, if the interval is one minute and the usage manager service 124 is obtaining point-in-time usage information, the usage manager service 124 may sample usage information multiple times during the minute interval and average the samples before sending the usage information to the usage manager service 124. In some embodiments, the usage manager service 124 may randomly assign a start time or an offset within an interval to each of the usage manager agents 154 associated with computer systems 150A-150N to distribute the timing of the transfers of usage information from each of the usage manager agents 154 to the usage manager service 124. Although illustrated within the environment 152, in some embodiments, the usage manager agent 154 is a software application executing alongside the environment 152 and the compute instances 156 and in communication with the environment 152 and/or the compute instances 156.

The usage manager service 124 is a provider network service that obtains usage information from the usage manager agents 154, evaluates the usage information against one or more customer-specified or workload-specific targets for a given compute instance 156 to generate limits, and sends the generated limits to the usage manager agent 154 to adjust the ability of the given compute instance 156 to utilize resources until a new limit is imposed. While the limits sent from the usage manager service 124 to the usage manager agent 154 affect the performance of the compute instance over a short period of time (e.g., a minute, five minutes, etc.), the customer-specified or workload-specific targets affect the performance of a compute instance over a long period of time (e.g., an hour, a day, a month, etc.). As a result, the usage manager service 124 can adjust the limits to offer increased or decreased performance relative to the target while attempting to match the aggregate resource usage of the compute instance over a longer period of time (e.g., a billing cycle) to the target. In some embodiments, the usage manager service 124 includes an API (not shown) that allows the targets for a compute instance to be set (e.g., via a call from the workload classifier service 122 or frontend 110). Additional details related to the adjustment of limits based on a target are provided below in the description associated with FIG. 2.

In some embodiments, targets are specified as relative or actual values associated with the usage of a specific resource. For example, compute-based targets may be specified based on a combination of one or more of percent usage of a processor (or accelerator), number of virtual processors attributed to a compute instance (which may be increased or decreased by the operating environment 152), number of processor cores, etc. Memory and storage targets may be specified based on a combination of one or more of total data footprint (e.g., the amount of RAM or non-volatile storage being used), input/output (I/O) operations per unit time (e.g., input/output operations per second or IOPS), consumption of available bandwidth, etc. Network targets may be specified based on a combination of one or more of IOPS, consumption of available bandwidth, etc. The usage manager service 124 evaluates the reported usage of a resource against the associated target as part of generating updated limit for a compute instance's resource usage.

As mentioned above, targets may be specified by a customer or based on a classification of the workload of a compute instance as determined by a workload classifier service 122. The workload classifier service 122 classifies workloads based on their usage of different resources such as CPU, memory, storage, and network as reported by a usage manager agent 154. In one embodiment, each reported resource corresponds to a dimension in a space related to various workloads. For example, usage information related to CPU and network interface resources may form a two-dimensional space. Each dimension can be divided into one or more regions or ranges. For example, a CPU dimension related to CPU utilization (based on % usage) can be divided into four components: X=0%, 0%<X<=30%, 30%<X<=80%, and 80%<X<=100%, where X is the reported CPU usage of a compute instance. The network interface dimension related to the amount of bandwidth used by a compute instance can be divided into two components: Y<=1 gigabit/second and 1 gigabit/second<Y, where Y is the reported network bandwidth usage of a compute instance. Based on these divisions, the space is divided into eight regions (4×2) that represent eight workload classifications or categories. The workload classifier service 122 evaluates reported compute instance usage information against these regions to classify the instance. One compute instance 156 might exhibit a workload with low CPU usage and high network usage while another compute instance might exhibit a workload with high CPU and low network usage. In some embodiments, the upper bounds of the dimensions are defined by the physical performance constraints of the resource (e.g., a network interface may transfer up to 10 gigabits (Gb)/s of data). The workload classifier service obtains per-compute instance usage information from the usage manager service 124 (e.g., via an API) and classifies the compute instance based on the reported usage information (e.g., by comparing the usage information of each resource to the ranges of a given dimension to identify the workload classification within the space). The workload classifier service 122 then sets targets based on the classification with the usage manager service 124 (e.g., via an API). The targets may be stored in an array indexed according to the location of region within the space. In some embodiments, the targets may be predetermined by the provider based on the maximum performance of the various resources of computer system 150. As in the case of the user-specified targets, the usage manager service 124 evaluates the reported usage of a resource against the associated workload-based target as part of adjusting a limit for the resource.

In some embodiments, the workload classifier service 122 refines the classification either at each reporting interval between a usage manager agent 154 and the usage manager service 124, or at some larger interval (e.g., every five reporting intervals). Further, the workload classifier service 122 may classify a compute instance's workload based on one or more prior sets of usage information (e.g., by averaging the prior hour, day, week, etc. of usage information), e.g., to account for unpredictable or irregular periods of increased resource usage.

In some embodiments, customers can specify targets based on the overall cost of operating the compute instance. For example, each compute resource (e.g., physical components of computer systems 150) may have an associated usage rate (e.g., for memory, cents per gigabyte per minute). A customer may specify a target in terms of the total cost of operating a compute instance for a period of time (e.g., for a month). When adjusting limits, the usage manager service 124 may apply the associated rate(s) to the reported resource usage(s) and evaluate the resulting cost (and any accrued cost) against the target and the amount of time remaining in the target period (e.g., a billing cycle). In some embodiments, the usage manager service 124 evaluates the cost of software licenses for licenses that are divisible based on usage when evaluating the resulting cost against the target in calculating new limits. For example, if an instance is executing an OS having a license that is paid for per-unit time consumed, the usage manager service 124 may factor that cost into the limit adjustments.

In some embodiments, the usage manager service 124 stores targets in a configuration data store 132 and reported usage data in a usage data store 134. Upon receiving usage information from a usage manager agent 154 for a compute instance 156, the usage manager service 124 obtains the target(s) from the configuration data store 132 associated with the compute instance 156, determines updated limits to be sent back to the usage manager agent 154, and stores the usage information in the usage data store 134. In some embodiments, the data stores 132, 134 may be provided by database services within the provider network 100, and may be relational or non-relational (e.g., "NoSQL"), distributed or non-distributed, etc. Additional details regarding an exemplary set of data structures stored within the data stores 132, 134 is provided below in the description associated with FIG. 3.

Once the usage manager service 124 has generated updated limits for a compute instance, it transfers the limits to the computer system 150 hosting the compute instance 156. In some embodiments, the usage manager service 124 sends the updated limits to the usage manager agent, e.g., as a response to the reportAndGet API call or by issuing a call to an API associated with the usage manager agent 154. The usage manager agent 154 sends the updated limits to one or more resource managers 158. Resource managers 158 are applications executing within the environment 152 that regulate the ability of the compute instances 156 to utilize the resources of the computer system 150 (e.g., processors, memory, network interfaces, etc.). An exemplary resource manager 158 is the control groups (cgroups) feature of the Linux OS for Linux-based environments 152. Another exemplary resource manager 158 is a scheduler within the environment 152. A scheduler may control the usage of resources of the computer system 150 by the compute instance 156 by adjusting the adjust the relative priority of the compute instance process(es) relative to other compute instances or processes or by suspending and resuming the compute instance process(es). In some embodiments, the usage manager service 124 sends updated limits to an API associated with the operating environment 152 rather than to the usage manager agent 154, and the environment 152 relays the updated limits to the resource manager(s) 158.

In some embodiments, the usage manager service 124 also transfer usage information to a metering service 136 and/or an archive data store 140. The metering service 136 may calculate costs to attribute to customers based on usage information. For example, a compute instance 156 that reports zero usage during over a period of time may accrue zero cost for that period of time. As compared to the usage data store 134, the archive data store 140 may be a separate data store that provides long term storage or logging of compute instance resource usage information. In some embodiments, the usage manager service 124 sends information related to the resource usage of a compute instance to a monitoring service 138. Based on the information, the monitoring service 138 may send alerts to the customer associated with a compute instance. Such alerts may be used to alert the customer that a compute instance has operated with a steady state resource usage at a target, which may indicate a need to adjust the target to alleviate a bottleneck.

Although illustrated as part of the hardware virtualization service 120, the usage manager service 124 and the workload classifier service 122 may be separate services executing on separate computer systems within the provider network 100 in communication with the hardware virtualization service 120. Further, the environment 152, including compute instances 156, usage manager agent 154, and resource managers 158, may execute on one or more processors.

Figure 2:
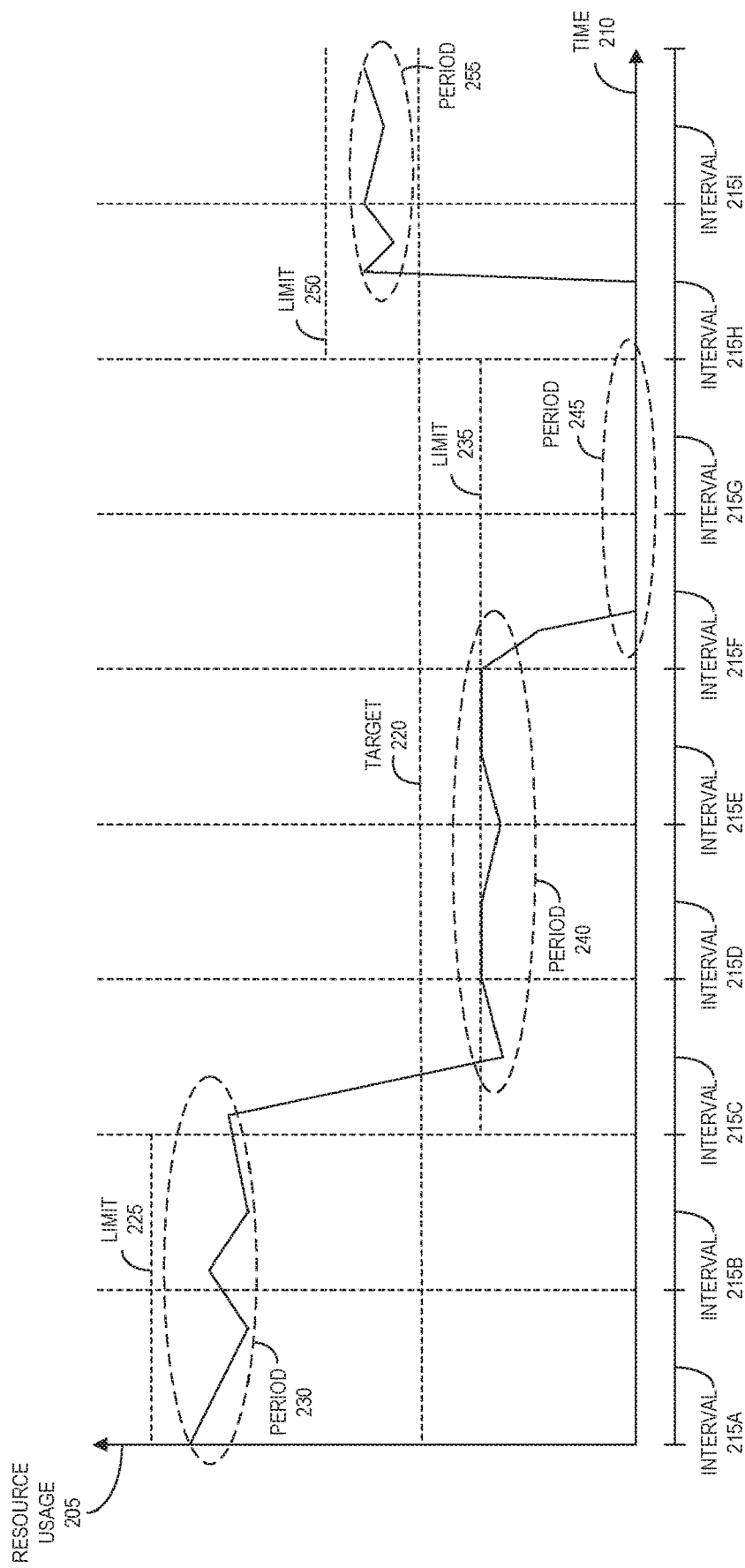
FIG. 2 is a diagram illustrating resource usage management over time according to some embodiments.

FIG. 2 is a diagram illustrating resource usage management over time according to some embodiments. The diagram plots the usage of a resource 205 (e.g., CPU, memory, etc.) on the y-axis against time 210 on the x-axis. Time 210 is divided into intervals 215 (e.g., 1 minute). A customer or a workload classifier may have specified a target 220 that represents an overall target for the usage manager service 124 in managing the resource consumption of a compute instance 156 over a longer period than the intervals 215 (e.g., 1 day). The usage manager service 124 can adjust resource usage limits above or below the target 220 across one or more intervals 215). At the beginning (or end) of each interval 215, usage information is transferred from a usage manager agent 154 to the usage manager service 124. The usage manager service 124 generated updated limits based on the usage information and the target 220.

In one embodiment, the usage manager service 124 generates updated limits by tracking the amount of time a compute instance operates using a resource above the target relative to the amount of time the compute instance uses the resource below the target. The compute instance accrues time to operate above the target while operating below the target and consumes that accrued time when operating above the target. In some embodiments, the accrued time to operate above the target may be capped. The usage manager service 124 generates updated limits based on whether the accrued time is non-negative. For example, as the accrued time increases, the usage manager service 124 may continue to increase the usage limit over subsequent intervals. In some embodiments, the usage manager service 124 stores the tracked time associated with an instance in the usage data store 134.

As shown in FIG. 2, the compute instance initially may be operating under the limit 225 that is above the target 220 (e.g., based on resource usage below the target during an earlier period), as indicated in period 230. Between interval 215B and 215C, the usage manager service 124 determines, based on the reported usage information and the target 220 to limit the compute instance resource usage. The usage manager service 124 sends an updated limit 235 to the usage manager agent 154, which causes a resource manager 158 to enforce the limit 235, as indicated in period 240. As shown, the compute instance's resource usage is constrained by the limit 235 during period 240. Later, during intervals 215F and 215G and under the same limit 235, the compute instance may consume none of the resource, as indicated in period 245. Between interval 215G and 215H, the usage manager service 124 determines, based on the reported usage information and the target 220 to adjust resource usage to limit 250, allowing the compute instance to again operate above the target 220, as indicated in period 255.

Figure 3:
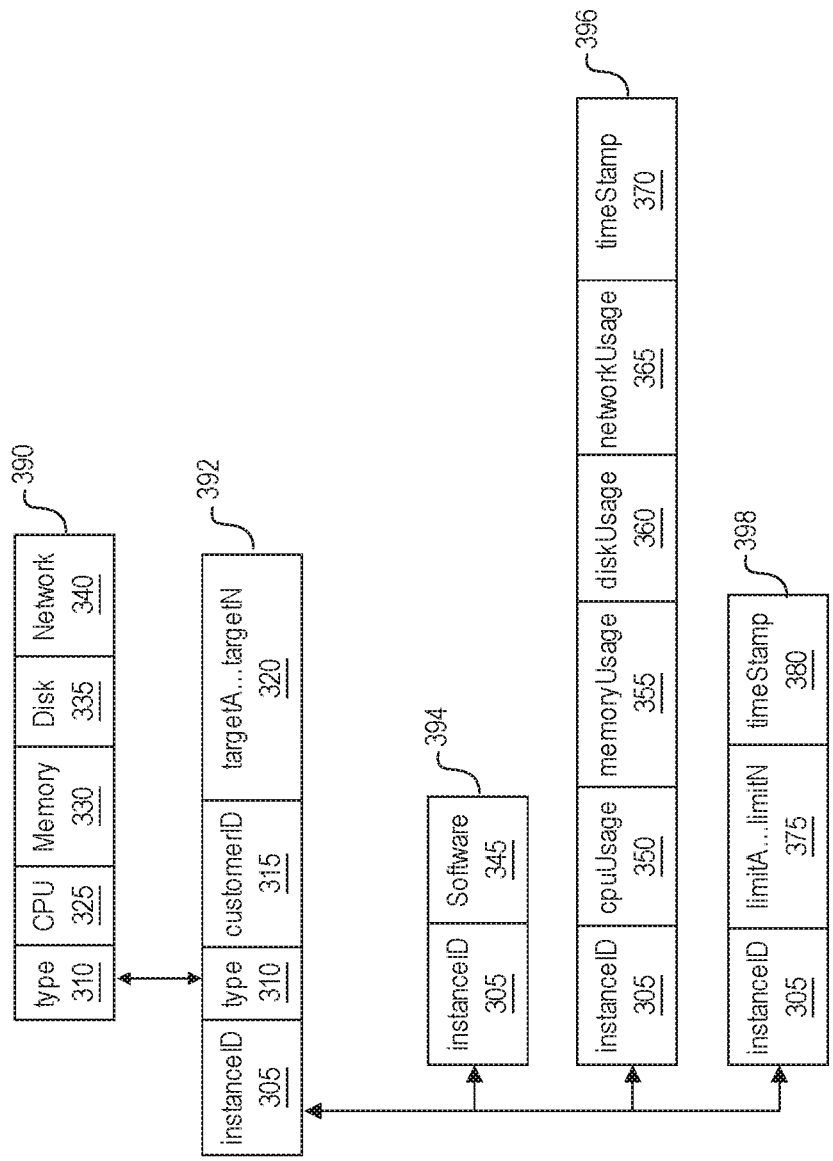
FIG. 3 is a diagram illustrating an exemplary set of data structures for storing data related to aspects of the present disclosure according to some embodiments.

FIG. 3 is a diagram illustrating an exemplary set of data structures for storing data related to aspects of the present disclosure according to some embodiments. In some embodiments, data associated with resource usage and management is stored in tables 390, 392, 394, 396, and 398. Table 392 includes fields for an instance identifier 305 that uniquely identifies compute instances within the provider network 100, a system type identifier 310 that may correspond with a computer system configuration that is hosting the instance, a customer identifier 315 that identifies the customer that owns the compute instance, and one or more targets 320 that may be specified by the customer or by the workload classifier service 122. Exemplary targets may be resource-specific (e.g., CPU, memory, storage, network usage) or resource-agnostic (e.g., relating to the overall performance of the compute instance), and may be specified as absolute or relative values (e.g., GB, GB/s, or percentages of total available performance). Table 390 stores performance characteristics of the computer system hosting the instance, as identified by the system type identifier 310. Table 390 includes a CPU field 325 that identifies the processors available to the system, a memory field 330 that identifies the memory available to the processor(s), a disk field 335 that identifies any local storage devices, and a network field 340 that identifies any network interfaces. These fields may be used as baseline performance values in cases where a target is specified in relative terms (e.g., 10% of RAM as a target in field 320 based on 8 GB of RAM in field 330) and may include cost rates for the associated resources. Table 394 includes a software field 345 that identifies any licensed software running on the compute instance that can be metered based on usage, as identified by the instance identifier 305. The software field 345 may include a cost rates for the associated software. Table 396 includes usage information based on the usage information obtained from usage manager agents 154, as identified by the instance identifier 305. In this example, table 396 includes usage fields for the CPU 350, memory 355, disk 360, and network 365. Table 396 also includes a timestamp 370 which may be obtained from a usage manager agent 154 or added by the usage manager service 124 upon obtaining the usage information from a usage manager agent. Table 398 includes one or more limits 375 as determined by the usage manager service 124 and a timestamp 380. In one embodiment, tables 390, 392, and 394 are stored in a database in the configuration data store 132 and tables 396 and 398 are stored in a database in the usage data store 134.

Figure 4:
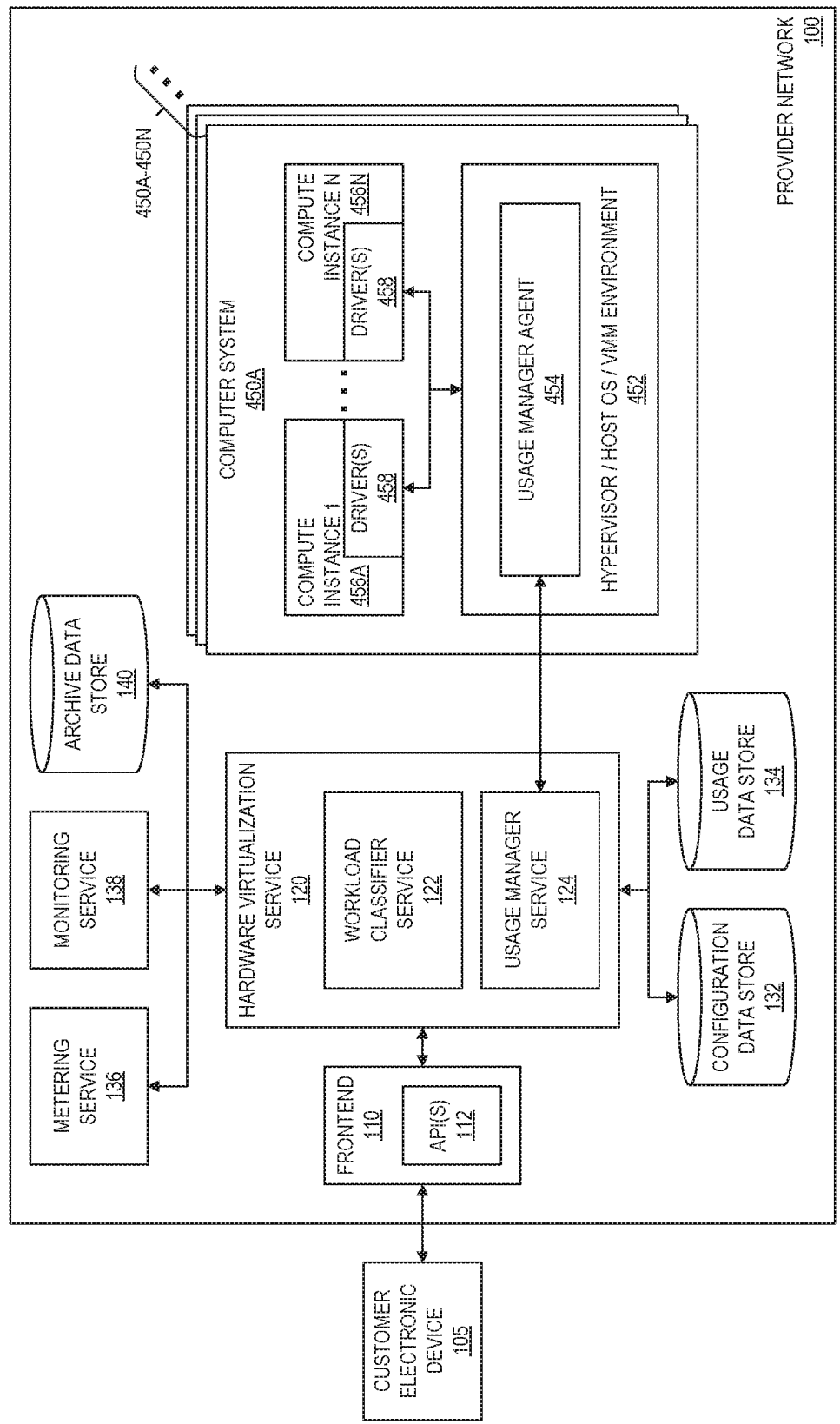
FIG. 4 is a diagram illustrating another environment for managing usage of computer systems in a provider network according to some embodiments.

FIG. 4 is a diagram illustrating another environment for managing usage of computer systems in a provider network according to some embodiments. With the exception of computer systems 450A-450N, the above description of the operation of components illustrated in FIG. 1 applies to the operation of the components illustrated in FIG. 4. In contrast to computer systems 150, computer systems 450 host compute instances 456 outside of a hypervisor, host OS, or VMM environment 452. For example, one processor of the computer system 450 might be executing a compute instance while another processor of the computer system 450 might be executing the environment 452. To facilitate obtaining usage information from the compute instances 456, the usage manager agent 454 communicates with the compute instances 456 via a shared memory (not shown) or via an interconnect, such as the Peripheral Component Interconnect-Express (PCIe) standard. For example, the compute instances 456 incorporate one or more drivers 458 that allows the usage manager agent to obtain usage information from the compute instances and to send updated limits to the compute instances 456. The usage manager agent 454 may issue an interrupt that causes the compute instances to report usage information to the usage manager agent 454. Alternatively, the driver(s) 458 may allow the usage manager agent 454 to issue commands to the compute instance to retrieve usage information. Similarly, the driver(s) 458 allows the usage manager agent 454 to send updated limits on resource usage (as received from the usage manager service 124) to the compute instances 456. The driver(s) 458 in turn relay the updated limits to resource managers (not shown) associated with the compute instances 456 that are part of the OS or other software executed as part of the compute instances 456. The resource managers can impose resource usage limits on the compute instance in a manner similar to the resource manager 158 described above (e.g., using kernel-based tools such as cgroups). A provider network 100 may include a combination of computer systems 150 and computer systems 450 sending usage information to the usage manager service 124.

Figure 5:
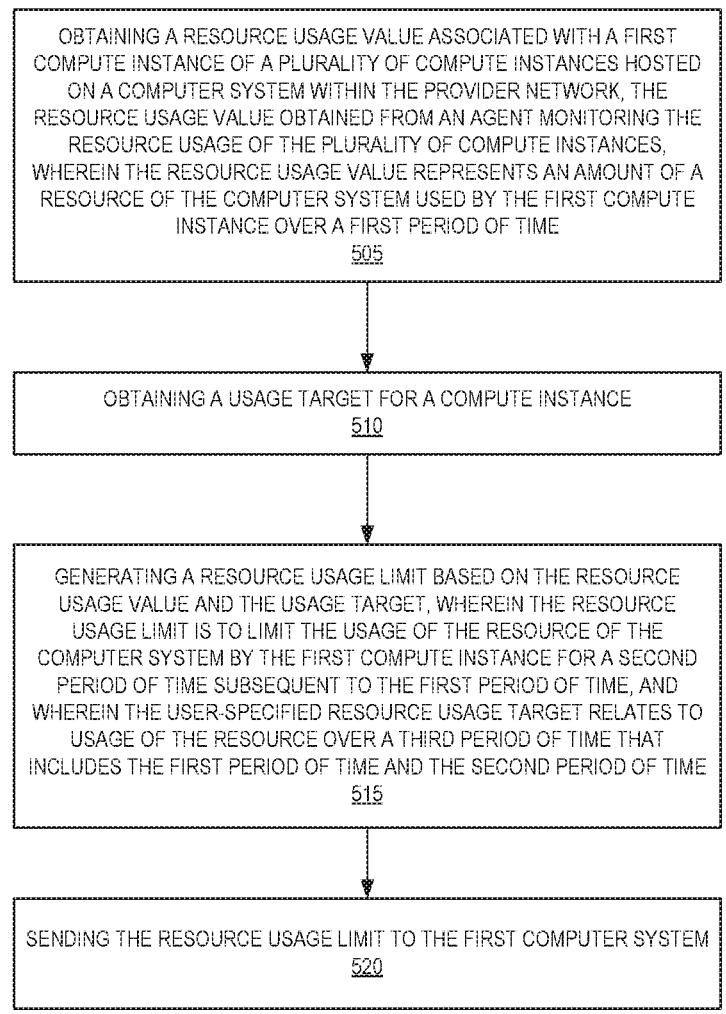
FIG. 5 is a flow diagram illustrating operations of a method for controlling usage of computer system resources in a provider network according to some embodiments.

FIG. 5 is a flow diagram illustrating operations of a method for controlling usage of computer system resources in a provider network according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the usage manager service 124 of the other figures.

The operations 500 include, at block 505, obtaining a resource usage value associated with a first compute instance of a plurality of compute instances hosted on a computer system within the provider network, the resource usage value obtained from an agent monitoring the resource usage of the plurality of compute instances, wherein the resource usage value represents an amount of a resource of the computer system used by the first compute instance over a first period of time. For example, the usage manager service 124 obtains usage information related to resources of a computer system 150, 450 from a usage manager agent 154, 454. Resources of a computer system can include one or more processors, memory, one or more storage devices, one or more network interfaces, and one or more accelerators. As explained above, the usage information may relate to how much of a resource a compute instance used during some period of time (e.g., an interval 215). Exemplary usage information may relate to CPU utilization (e.g., a percentage of total CPU capacity), memory or storage usage (e.g., in terms of compute instance footprint within memory or compute instance IOPS), or network usage (e.g., in terms of compute instance bandwidth consumption or compute instance IOPS).

The operations 500 include, at block 510, obtaining a usage target for a compute instance. As described above, the usage manager service 124 may receive a usage target for a compute instance from a customer of the provider network or from the workload classifier service 122. The target may be received via an API associated with the usage manager service 124.

The operations 500 include, at block 515, generating a resource usage limit based on the resource usage value and the usage target, wherein the resource usage limit is to limit the usage of the resource of the computer system by the first compute instance for a second period of time subsequent to the first period of time, and wherein the user-specified resource usage target relates to usage of the resource over a third period of time that includes the first period of time and the second period of time. As described above, the usage manager service 124 generates limits to impose on the performance of the compute instance (e.g., by limiting its access to host system resources) based on the usage information (e.g., as obtained from the usage manager agent 154, 454) and the usage target. In some embodiments, the usage manager service 124 increases limits after periods of compute instance resource usage below the target and decreases limits after periods of compute instance resource usage above the target.

The operations 500 include, at block 520, sending the resource usage limit to the first computer system. As described above, the usage manager service 124 sends updated limits to the computer system 150, 450 hosting the compute instance being managed. In some embodiments, the limits are sent back to the usage manager agent 154, 454, which passes the limits to a resource manager 158 or a driver 458 to enforce the limitations on resource usage against the compute instance.

Figure 6:
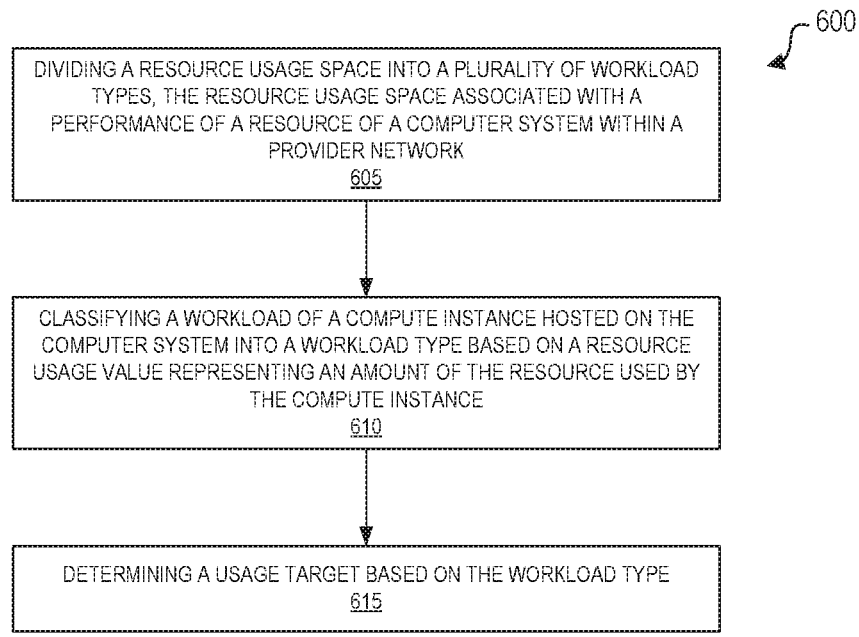
FIG. 6 is a flow diagram illustrating operations of a method for classifying customer workloads based on usage of computer system resources in a provider network according to some embodiments.

FIG. 6 is a flow diagram illustrating operations of a method for classifying customer workloads based on usage of computer system resources in a provider network according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the workload classifier service 122 of the other figures.

The operations 600 include, at block 605, dividing a resource usage space into a plurality of workload types, the resource usage space associated with a performance of a resource of a computer system within a provider network. As explained above, workloads may be characterized according to a space defined by dimensions corresponding to resources of a computer system (e.g., one dimension corresponds to CPU usage, another to memory usage, another to network usage, and so on). Each dimension may be divided into ranges (e.g., low, medium, and high) relative to the maximum performance of the resource. The regions in the space corresponding to a range within each of the dimensions represent workload classifications or types. In some embodiments, the space is divided into classifications based on provider-specified dimensions, ranges, and performance characteristics for a given computer system 150, 450. The operations 600 include, at block 610, classifying a workload of a compute instance hosted on the computer system into a workload type based on a resource usage value representing an amount of the resource used by the compute instance. As described above, the workload classifier service 122 may compare the usage information of each resource to ranges within the dimensions corresponding to the resource. Based on the usage information for each resource, the workload classifier service 122 can determine the workload classification within the space that the compute instance falls within. The operations 600 include, at block 615, determining a usage target based on the workload type. As described above, the workload classifier service 122 may obtain resource targets based on the workload classification (e.g., by using the location of the region within the space to index an array).

Figure 7:
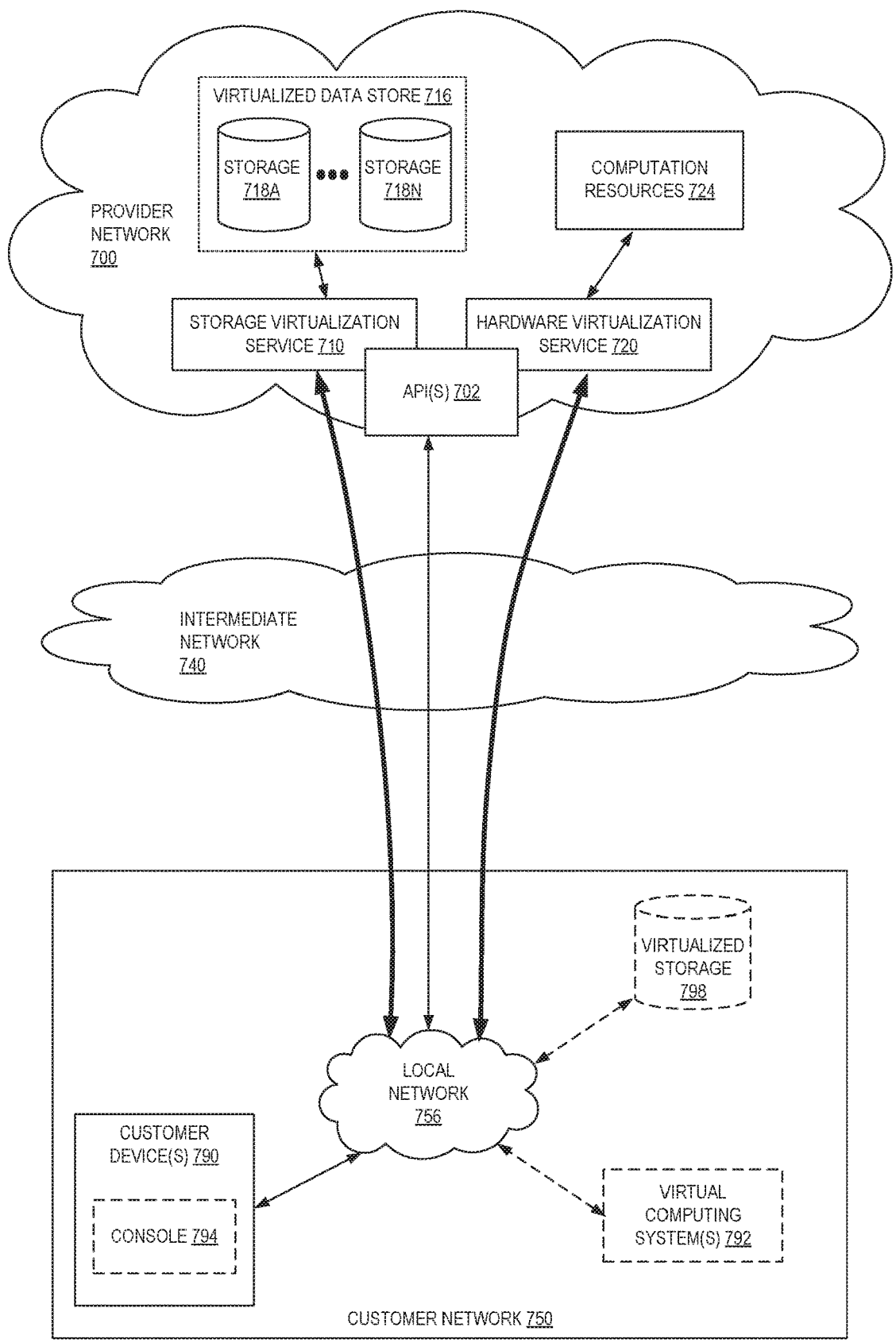
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., compute instances) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
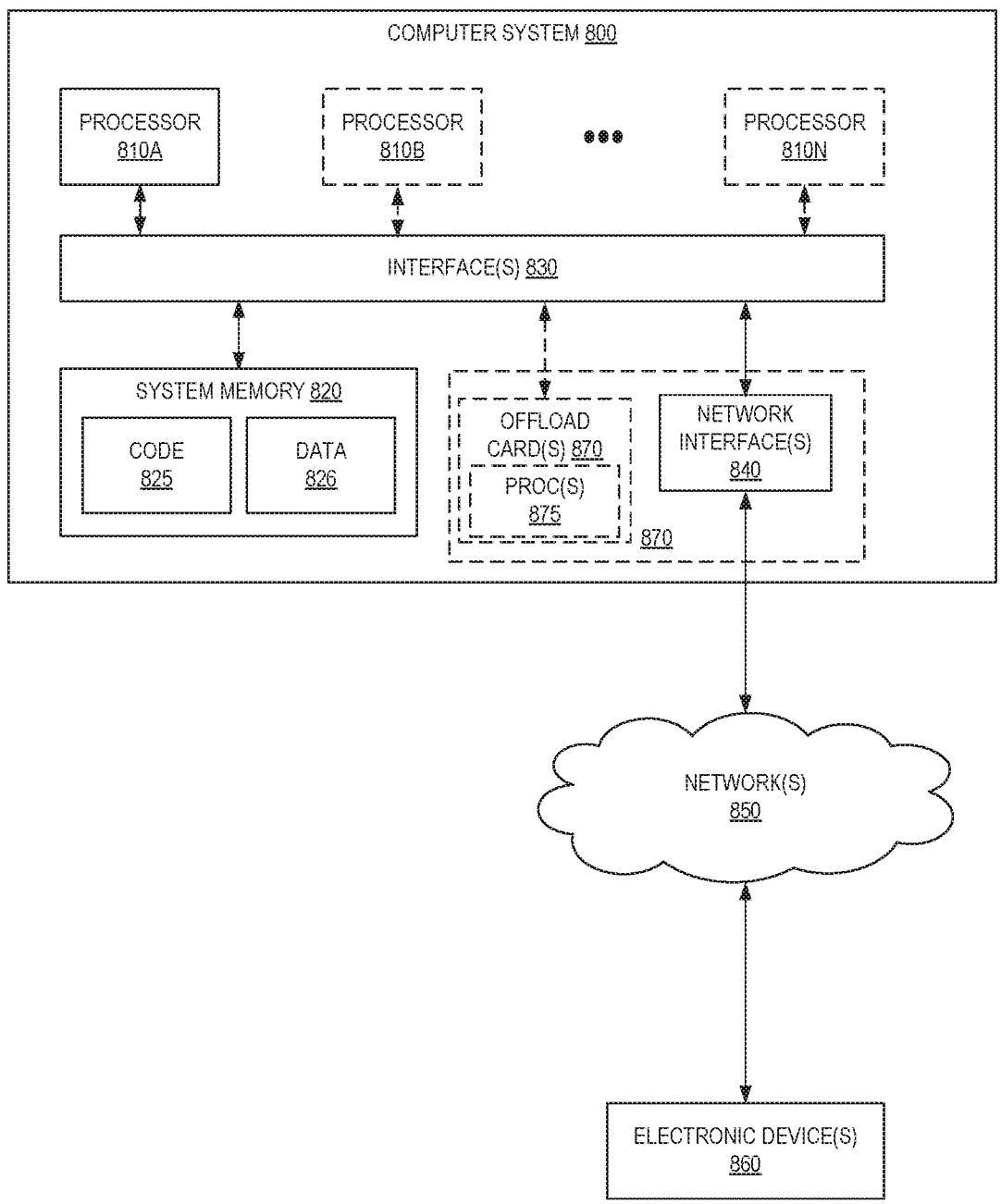
FIG. 8 is a block diagram illustrating an example computer system that may be used in some embodiments.

In some embodiments, a system that implements a portion or all of the techniques for managing usage of computer system resources in a provider network as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the PCIe standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc.

The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 156A-156N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining, by a service of a provider network, a first resource usage value associated with a first compute instance of a plurality of compute instances hosted on a computer system within the provider network, the first resource usage value obtained from an agent monitoring resource usage of the plurality of compute instances, wherein the first resource usage value represents an amount of a resource of the computer system used by the first compute instance over a first period of time when the compute instance operated under a first resource usage limit;
generating, by the service, a second resource usage limit based on the first resource usage value and a user-specified resource usage target associated with the first compute instance, wherein the second resource usage limit is to limit the usage of the resource of the computer system by the first compute instance for a second period of time subsequent to the first period of time, wherein the second resource usage limit is larger than both the first resource usage limit and the user-specified resource usage target, and wherein the user-specified resource usage target relates to usage of the resource over a third period of time that includes at least the first period of time and the second period of time; and
sending the second resource usage limit to the computer system.

2. The computer-implemented method of claim 1, wherein the resource is a processor, a memory, or a network interface of the computer system.

3. The computer-implemented method of claim 1, further comprising obtaining a second resource usage value associated with the first compute instance, wherein the second resource usage value represents an amount of the resource of the computer system used by the first compute instance over a fourth period of time that is also part of the third period of time, and wherein the second resource usage limit is further based on the second resource usage value.

4. The computer-implemented method of claim 1, wherein a resource manager executed by the computer system adjusts an ability of the first compute instance to utilize the resource of the computer system over the second period of time based at least in part on the second resource usage limit.

5. A computer-implemented method comprising:
obtaining, by a service of a provider network, a first resource usage value associated with a compute instance hosted on a computer system within the provider network, the first resource usage value obtained from an agent monitoring resource usage of the compute instance, wherein the first resource usage value represents an amount of a resource of the computer system used by the compute instance over a first period of time when the compute instance operated under a first resource usage limit;
generating a second resource usage limit associated with the compute instance for a second period of time subsequent to the first period of time, wherein the second resource usage limit is determined based at least in part on the first resource usage value and a target amount of resource usage, and wherein the second resource usage limit is larger than the first resource usage limit and is also larger than the target amount of resource usage; and
sending the second resource usage limit to the computer system.

6. The computer-implemented method of claim 5, further comprising:
classifying a workload of the compute instance based at least in part on the first resource usage value, wherein the workload corresponds to a range of usage of the resource; and
determining the target amount based on the workload.

7. The computer-implemented method of claim 5, wherein the target amount relates to usage of the resource over a third period of time that includes the first period of time and the second period of time.

8. The computer-implemented method of claim 5, wherein the target amount is specified by a user via an application programming interface (API) call issued by an electronic device in communication with the provider network.

9. The computer-implemented method of claim 5, further comprising sending the first resource usage value to a metering service of the provider network.

10. The computer-implemented method of claim 5, wherein the computer system executes the agent, a hypervisor, and the compute instance.

11. The computer-implemented method of claim 5, wherein the resource is a processor, a memory, or a network interface of the computer system.

12. The computer-implemented method of claim 5, further comprising obtaining, by the service, a third resource usage value associated with the compute instance that represents an amount of the resource of the computer system used by the compute instance over a third period of time, and wherein the second resource usage limit is further determined based on the third resource usage value.

13. The computer-implemented method of claim 5, further comprising:
obtaining, by the service, a third resource usage value associated with the compute instance from the agent, wherein the third resource usage value represents an amount of the resource of the computer system used by the compute instance over the second period of time;
generating, by the service, a third resource usage limit based at least on the third resource usage value and the target amount, wherein the third resource usage limit is less than the second resource usage limit; and
sending the third resource usage limit to the computer system.

14. The computer-implemented method of claim 5, wherein a resource manager executed by the computer system adjusts an ability of the compute instance to utilize the resource of the computer system over the second period of time based at least in part on the second resource usage limit.

15. A system comprising:
an agent implemented by a computer system coupled to a provider network, the computer system hosting a compute instance, wherein the agent is to send a first resource usage value representing an amount of a resource of the computer system used by the compute instance over a first period of time when the compute instance operated under a first resource usage limit; and
a usage manager service implemented by a second one or more processing devices, the usage manager service including instructions that upon execution cause the second one or more processing devices to:
obtain the first resource usage value from the agent via the provider network;
generate a second resource usage limit associated with the compute instance for a second period of time subsequent to the first period of time, wherein the second resource usage limit is determined based at least in part on the first resource usage value and a target amount of resource usage, and wherein the second resource usage limit is larger than the first resource usage limit and is also larger than the target amount of resource usage; and
send the second resource usage limit to the computer system.

16. The system of claim 15, further comprising a workload classification service implemented by a third one or more processing devices, the workload classification service including instructions that upon execution cause the third one or more processing devices to:
classify a workload of the compute instance based at least in part on the first resource usage value, wherein the workload corresponds to a range of usage of the resource; and
determine the target amount based on the workload.

17. The system of claim 15, wherein the target amount relates to usage of the resource over a third period of time that includes the first period of time and the second period of time.

18. The system of claim 15, wherein the target amount is specified by a user via an application programming interface (API) call issued by an electronic device in communication with the provider network.

19. The system of claim 15, wherein the usage manager service is to further cause the second one or more processing devices to send the first resource usage value to a metering service of the provider network.

20. The system of claim 15, wherein the computer system executes the agent, a hypervisor, and the compute instance.

21. The system of claim 15, wherein the resource is a processor, a memory, or a network interface of the computer system.

22. The system of claim 15, wherein the usage manager service is to further cause the second one or more processing devices to obtain a third resource usage value associated with the compute instance that represents an amount of the resource of the computer system used by the compute instance over a third period of time, and wherein the second resource usage limit is further determined based on the third resource usage value.

23. The system of claim 15, further comprising a resource manager implemented by the computer system to utilize the second resource usage limit to adjust an ability of the compute instance to utilize the resource of the computer system over the second period of time.

* * * * *